United States Patent

[11] 3,628,418

| [72] | Inventor | Thomas S. Honda<br>Scotia, N.Y. |
| [21] | Appl. No. | 4,849 |
| [22] | Filed | Jan. 22, 1970 |
| [45] | Patented | Dec. 21, 1971 |
| [73] | Assignee | General Electric Company |

[54] VORTEX VALVE SERVOACTUATOR
5 Claims, 3 Drawing Figs.

[52] U.S. Cl. ............................................. 91/47,
   91/384, 91/417, 91/461
[51] Int. Cl. ..................................... F15b 13/042,
   F15b 9/10, F15b 15/17
[50] Field of Search ............................. 91/3, 51,
   52, 461, 384, 47, 417; 137/81.5

[56] References Cited
UNITED STATES PATENTS

| 3,093,121 | 6/1963 | Murphy | 91/384 |
| 3,152,612 | 10/1964 | Avery | 91/51 |
| 3,386,343 | 6/1968 | Gray | 91/3 |
| 3,410,291 | 11/1968 | Boothe et al. | 137/81.5 |
| 3,473,545 | 10/1969 | Boyadjieff | 137/81.5 |
| 3,486,416 | 12/1969 | Eastman | 91/51 |

Primary Examiner—Paul E. Maslousky
Attorneys—Derek P. Lawrence, Thomas J. Bird, Jr., Lee H. Sachs, Frank L. Neuhauser, Oscar B. Waddell and Joseph B. Forman ABSTRACT: A servoactuator is disclosed which comprises a two stage servo in combination with a differential piston area actuator, the second servo stage comprising a pair of serially connected fluid vortex amplifiers.

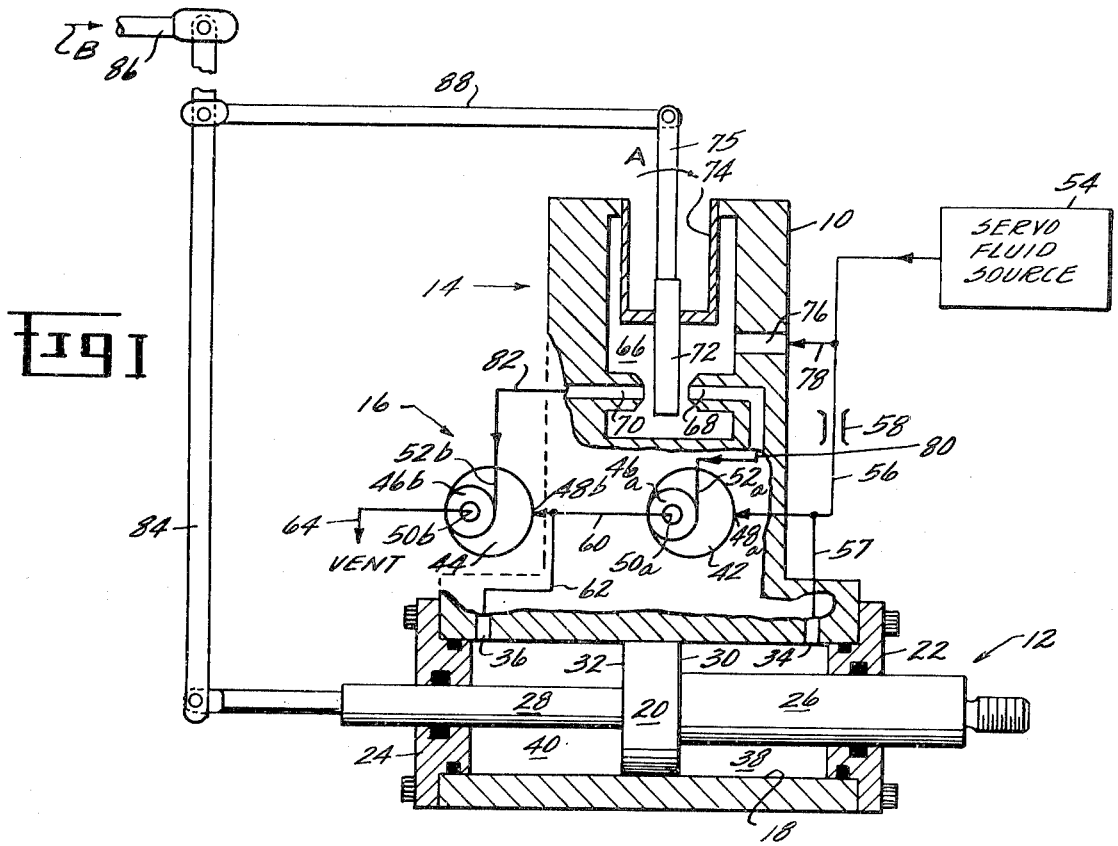
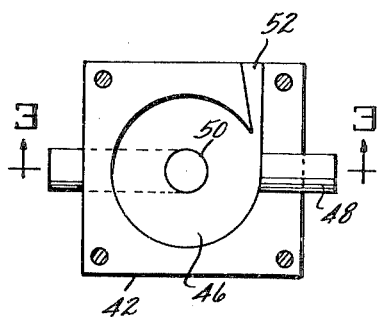
INVENTOR.
THOMAS F. HONDA
BY
Loren W. Peters

VORTEX VALVE SERVOACTUATOR

BACKGROUND OF THE INVENTION

This invention relates to fluid control devices and more particularly to fluid-powered servoactuators.

Fluid-operated servoactuators capable of significant power outputs usually comprise at least two stages of amplification of a signal level input to provide power fluid for the actuator element. The first stage may be a frictionless device such as a flapper or jet pipe, or it may consist of a spool valve. The second stage typically comprises a spool valve actuated in response to the output of the first stage. In many applications it is desirable to avoid using sliding spools or other such devices because friction therein can contribute to hysteresis in the servoactuator and because such devices are subject to becoming clogged with contaminants contained in the servo fluid. One fluidic device, the vortex amplifier, offers sufficient controllable power output to replace the sliding spool as a second stage amplifier in a servovalve. Vortex amplifiers in parallel have been used in such an application, as shown by U.S. Pat. No. 3,410,291, Nov. 12, 1968, to Boothe and Shinn; however, they have one drawback. A characteristic requirement of vortex amplifiers is a continual quiescent flow of power fluid. In large devices, the quiescent flow required for two or more paralleled vortex amplifiers can be excessive. Applicant has minimized the quiescent flow problem by providing a novel combination comprising two serially connected vortex amplifiers and a differential area piston and appropriate fluid control circuit. The result is attainment of the advantages of vortex amplifiers with acceptable quiescent fluid flow.

BRIEF SUMMARY OF THE INVENTION

Briefly stated, the invention is a servoactuator comprising an input servo stage, a second servo stage comprising two serially connected vortex amplifiers controlled by the first servo stage, and a piston having two faces with different effective areas, the smaller face being exposed to inlet pressure of the first vortex amplifier in the series and the larger face being exposed to inlet pressure to the second vortex amplifier in the series.

BRIEF DESCRIPTION OF THE DRAWINGS

WHe the specification concludes with claims particularly pointing out and distinctly claiming the invention, it is more readily understandable by reference to the discussion below and the accompanying drawings, in which:

FIG. 1 is a partially schematic, partially section view of a fluid servoactuator;

FIG. 2 is a view of a vortex amplifier taken along line 2—2 of FIG. 3, and

FIG. 3 is a section view taken along line 3—3 of FIG. 2.

DESCRIPTION OF THE PREFERRED EMBODIMENT
servo

FIG. 1 illustrates a preferred embodiment of the invention comprising a housing 10 which includes a double acting actuator 12, a first stage servo means 14, and a second stage servo means 15.

Actuator 12 comprises a cylinder or cylindrical bore 18 in housing 10 and a piston 20 slideably disposed therein. A pair of caps 22, 24 close the ends of cylinder 18. Piston 20 includes an actuating rod 26 which extends through cap 22 and a position feedback rod 28 extending through cap 24, each of rods 26, 28 being sealingly engaged with the respective caps 22, 24. Rod 26 has a larger cross section than rod 28 so that the effective area of piston face 30 is less than that of piston face 32. Cylinder input connections or ports 34, 36 are provided to connect chambers 38, 40 respectively to a servo pressure source, and thus provide pressurized fluid to act on the respective piston faces 30, 32.

Actuating fluid is supplied to ports 34, 36 from second stage servo means 16, which comprises fluidic vortex amplifiers 42, 44 in series and suitable supply and signal conduits or passageways connected as hereafter described. Each vortex amplifier can be constructed as shown by FIGS. 2 and 3, and comprises a spin chamber 46 having a radial fluid inlet 48, a center outlet 50, and a tangential signal inlet 52. When signal inlet 52 is not pressurized in excess of the pressure in chamber 46 and no fluid is flowing therethrough, the resistance to fluid flow from inlet 48 to center outlet 50 is relatively unrestricted. However, when fluid is made to flow through signal inlet 52, a vortex is created in which fluid coming through inlet 48 is caught, thereby raising the flow resistance from inlet 48 to outlet 50. The magnitude of this flow resistance increases with the velocity of the fluid entering chamber 46 through signal inlet 52, and thus increases with the pressure of the fluid supplied thereto.

Referring back to FIG. 1, correspondents of elements 48, 50 and 52 are noted with the letters a and b for vortex amplifiers 42 and 44 respectively. Amplifier 42 is supplied with servo fluid from a source 54 via servo input conduit or passageway 56, which includes a flow restrictor 58, and a branch 57 connected to actuator input port 34. A connecting conduit or passageway 60 connects outlet 50a of amplifier 42 with inlet 48b of amplifier 42, and an actuation conduit or passageway 62 is teed into passageway 60 and connects it with actuator inlet port 36. Fluid from amplifier 44 is vented to a low pressure sink by a conduit or passageway 64 connected at outlet 50b.

Control signal inputs to amplifiers 42, 44 are derived from the first stage servo 14, which comprises a cavity 66 defined in housing 10 and containing an inverted flapper valve. The flapper valve comprises a pair of axially spaced outlet openings 68, 70 and a flat bar 72 interposed between openings 68, 70 and spaced therefrom. Bar 72 is suspended in housing 10 by a flexible pivot 74 and includes a lever 75 extending outside the confines of housing 10. A servo fluid inlet 76 is connected by conduits 78 and 56 to servo fluid source 54. Fluid discharged from cavity 66 is provided to amplifier signal inlets 52a and 52b from outlet openings 68, 70 respectively by passageways or conduits 80, 82.

Actuating signal input to the servovalve is provided at lever 75. For example, input motion of lever 75 in the direction indicated by arrow A will reduce the effective flow area through outlet opening 70 and correspondingly increase the effective flow area through outlet opening 68. The resulting signal flow change will raise the flow resistance of amplifier 42 and lower the flow resistance of amplifier 44, which will in turn raise the fluid pressure in branch 57 and on piston face 30, and will lower the fluid pressure in conduit 62 and thus on piston face 32, causing piston 20 to move to the left. An input opposite to the direction of arrow A will have the opposite effect throughout the servoactuator.

The servoactuator can be used as a position servo by providing the input to lever 75 through a summing linkage which comprises a summing link 86 pivotally connected at one end to feedback rod 28, an input link 86 pivotally connected to summing ink 84 at its opposite end, and an intermediate link 88 connecting lever 75 to summing link 84 at a point intermediates its ends. Input motion of link 86 in the direction of arrow B, for example, will cause lever 75 to move in direction A, resulting in piston 20 moving to the left as described above. Motion of piston 20 to the left causes summing bar 84 through link 88 to move lever 75 in a direction opposite arrow A and thus null out the original input.

Vortex fluid amplifiers have several advantages in servovalve applications, among which are the absence of moving valve spools which could be subject to becoming lodged with foreign particles in the servo fluid and the absence of friction and resulting hysteresis effects on overall servovalve performance. One disadvantage however is that vortex amplifiers require a quiescent flow of servo fluid which places demands upon the servo fluid source. THis disadvantage is minimized and brought within acceptable limits by the present invention wherein the quiescent flow requirements of the two vortex amplifiers 42, 44 are met by connecting them in series, and overall servovalve capability is attained by a combination of the series connected vortex valves with an actuator having a piston area differential.

Having above described one embodiment of the invention, though not exhaustive of all possible equivalents, what is desired to be secured by Letters Patent is claimed below.

What is claimed is:

1. A fluidic servoactuator comprising:
   a first stage servomechanism;
   a second stage servomechanism including a first fluid vortex amplifier having an inlet, an outlet, and a signal inlet, and a second fluid vortex amplifier having an inlet, an outlet, and a signal inlet, said outlet of said first amplifier being connected to said inlet of said second amplifier;
   means for supplying servo fluid to said first and second stage servomechanisms;
   an actuator which comprises a cylinder with a piston disposed herein, said cylinder and said piston defining opposed compartments having different effective cross-sectional areas on either side of said piston, said actuator additionally including a first input connection with a first of said compartments and a second input connection with a second of said compartments; and
   a first conduit connecting said inlet of said first amplifier to said first input connection and a second conduit connecting said outlet of said first amplifier to said second input connection.

2. The fluidic servoactuator recited in claim 1 further characterized in that said first stage servomechanism includes means for selectively pressurizing said signal inlets of said first and second amplifiers.

3. The fluidic servoactuator recited in claim 2 wherein said first stage servomechanism comprises an inverted double acting flapper valve comprising housing means, a cavity in said housing means, a servo fluid inlet into said cavity, a pair of relatively closely spaced opposed fluid outlet ports in said housing opening from said cavity and connected to separate ones of said vortex amplifier signal inlets, a bar pivotally supported in said housing means and interposed between said outlet ports, and means for moving said bar with respect to said outlet ports.

4. The fluidic servoactuator recited in claim 3 wherein said piston includes a feedback rod extending through an end wall of said cylinder.

5. The fluidic servoactuator recited in claim 4 wherein the means for moving said bar comprises said feedback rod, a summing link pivotally connected to said feedback rod, and a link pivotally connected at its one end to said summing link and at its opposite end to said bar.

* * * * *